US008898488B2

(12) United States Patent
Lin (10) Patent No.: US 8,898,488 B2
(45) Date of Patent: Nov. 25, 2014

(54) PROCESSING DEVICE RECEIVING DIFFERENT POWER DURING DIFFERENT STATES

(75) Inventor: Woei-Harng Lin, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 544 days.

(21) Appl. No.: 13/101,528

(22) Filed: May 5, 2011

(65) Prior Publication Data

US 2012/0173893 A1    Jul. 5, 2012

(30) Foreign Application Priority Data

Dec. 30, 2010    (TW) .............................. 99146830 A (51) Int. Cl.
  *G06F 1/00*    (2006.01)
  *G06F 1/32*    (2006.01)

(52) U.S. Cl.
  USPC ............................ 713/300; 713/310; 713/320

(58) Field of Classification Search
  USPC .......................................... 713/300, 310, 320
  See application file for complete search history.

(56) References Cited

U.S. PATENT DOCUMENTS

| | | | | | |
|---|---|---|---|---|---|
| 7,149,906 | B2 * | 12/2006 | Sakai | ............................ | 713/300 |
| 7,451,328 | B2 * | 11/2008 | Hsieh | ............................ | 713/300 |
| 8,046,594 | B2 * | 10/2011 | Lee | ............................ | 713/300 |
| 8,051,308 | B2 * | 11/2011 | Hsieh | ............................ | 713/300 |
| 8,504,853 | B2 * | 8/2013 | Carlsen et al. | ................ | 713/300 |
| 2004/0063464 | A1 * | 4/2004 | Akram et al. | ................. | 455/559 |
| 2005/0050234 | A1 * | 3/2005 | Choi | ............................ | 710/2 |
| 2005/0110350 | A1 * | 5/2005 | Koehler | ........................ | 307/130 |
| 2005/0216649 | A1 * | 9/2005 | Yoshida et al. | ............... | 710/313 |
| 2005/0240784 | A1 * | 10/2005 | Sugasawa | ..................... | 713/300 |
| 2006/0036885 | A1 * | 2/2006 | Hsieh | ............................ | 713/300 |
| 2007/0237462 | A1 * | 10/2007 | Aronson et al. | ................ | 385/89 |
| 2008/0082842 | A1 * | 4/2008 | Minami | ........................ | 713/300 |
| 2008/0162755 | A1 * | 7/2008 | Minami | ......................... | 710/74 |
| 2010/0042778 | A1 * | 2/2010 | Tanguay et al. | ............... | 711/105 |
| 2010/0146307 | A1 * | 6/2010 | Griffin et al. | ................. | 713/300 |
| 2011/0066870 | A1 * | 3/2011 | Chen et al. | ..................... | 713/324 |
| 2011/0167284 | A1 * | 7/2011 | Van Der Velden | ............ | 713/320 |
| 2011/0239009 | A1 * | 9/2011 | Noda | ............................ | 713/300 |

FOREIGN PATENT DOCUMENTS

| | | |
|---|---|---|
| CN | 1702600 | 11/2005 |
| TW | 200718015 | 5/2007 |
| TW | 200848999 | 12/2008 |
| TW | 201014052 | 4/2010 |

OTHER PUBLICATIONS

English language translation of abstract of TW 200718015 (published May 1, 2007).
English language translation of abstract of TW 200848999 (published Dec. 16, 2008).
English language translation of abstract of TW 201014052 (published Apr. 1, 2010).
English language translation of abstract of CN 1702600 (published Nov. 30, 2005).

* cited by examiner

*Primary Examiner* — Zahid Choudhury
(74) *Attorney, Agent, or Firm* — McClure, Qualey & Rodack, LLP (57) ABSTRACT

A processing device coupled to a host device via a connection device and including a connection port, a control unit and a switching unit is disclosed. The connection port connects to the connection device. The control unit controls a switching signal according to the kind of the connection device when the connection port is coupled between the connection port and the host device. The switching unit transmits an external power to the control unit according to the switching signal. When the switching unit transmits the external power to the control unit, the control unit operates according to the external power provided by an external device. When the switching unit does not transmit the external power to the control unit, the control unit operates according to a host power provided by the host device.

21 Claims, 7 Drawing Sheets

PROCESSING DEVICE RECEIVING DIFFERENT POWER DURING DIFFERENT STATES

CROSS REFERENCE TO RELATED APPLICATIONS

This Application claims priority of Taiwan Patent Application No. 099146830, filed on Dec. 30, 2010, the entirety of which is incorporated by reference herein.

BACKGROUND OF THE INVENTION

1. Field of the Invention

The invention relates to a processing device, and more particularly to a processing device receiving different power during different states.

2. Description of the Related Art

With technological development, the types of peripheral devices of computers have increased. Generally, each peripheral device communicates with a computer via a connection cable in a wire transmission structure. Some peripheral devices receive independent power from external devices. For example, an adapter transforms home power into an operation power and provides the transformation result to the peripheral devices.

However, a portion of the connection cables also comprise a function to transmit power. When a connection cable with the transmitting function is coupled between a peripheral device and a computer, a host power provided by the computer is transmitted to the peripheral device via the connection cable. When the peripheral device simultaneously receives the operation power provided by an adapter and the host power provided by the computer for a long period of time, one power collides with the other power to damage the peripheral device.

BRIEF SUMMARY OF THE INVENTION

In accordance with an embodiment, a processing device can couple to a host device via a connection device and comprises a connection port, a control unit and a switching unit. The connection port connects to the connection device. The control unit controls a switching signal according to the kind of the connection device when the connection is coupled between the connection port and the host device. The switching unit transmits an external power to the control unit according to the switching signal. When the switching unit transmits the external power to the control unit, the control unit operates according to the external power provided by an external device. When the switching unit does not transmit the external power to the control unit, the control unit operates according to a host power provided by the host device.

Operation systems are also provided. An exemplary embodiment of an operation system comprises a host device and a processing device. The host device comprises a first connection port and provides a host power. The processing device is coupled to the host device via a connection device and comprises a control unit and a first switching unit. The control unit controls a first switching signal according to the kind of the connection device when the connection is coupled between the first connection port and a second connection port of the processing unit. The first switching unit transmits an external power to the control unit according to the first switching signal. When the first switching unit transmits the external power to the control unit, the control unit operates according to the external power. When the first switching unit does not transmit the external power to the control unit, the control unit operates according to the host power.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
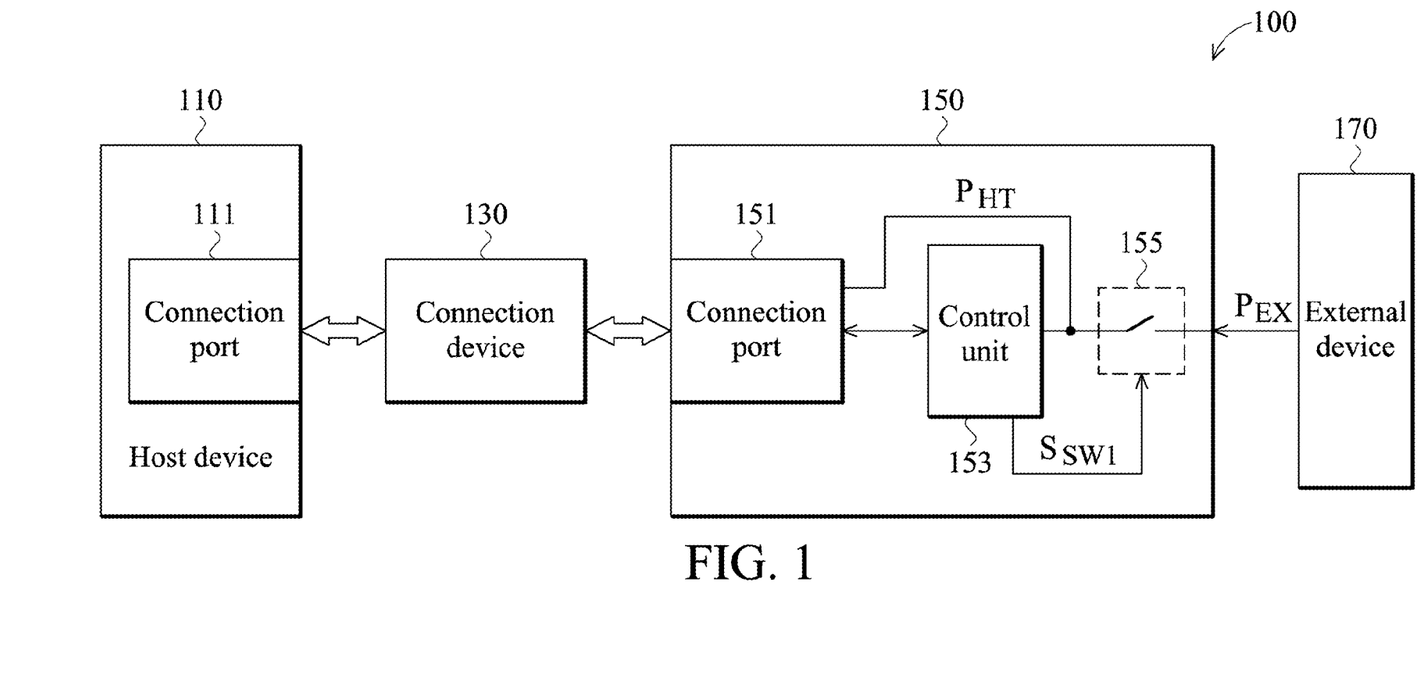
FIG. 1 is a schematic diagram of an exemplary embodiment of an operation system of the invention.

FIG. 1 is a schematic diagram of an exemplary embodiment of an operation system of the invention. The operation system 100 comprises a host device 110 and a processing device 150. In this embodiment, the host device 110 comprises a connection port 111. The host device 110 outputs a host power $P_{HT}$ via the connection port 111.

The processing device 150 is coupled to the host device 110 via the connection device 130. The host device 110 communicates with the processing device 150 via the connection device 130. The invention does not limit the kind of the connection device 130. For example, the connection device 130 is an active optical cable (AOC) or a common cable, such as a USB 2.0 cable or a USB 3.0 cable.

Additionally, the invention does not limit the kind of the processing device 150. In one embodiment, the processing device 150 is a USB 3.0 hub or a USB 3.0 peripheral device, such as a hard disk (HD).

In this embodiment, the processing device 150 receives an external power $P_{EX}$ provided by an external device 170. The processing device 150 comprises a control unit 153 and a switching unit 155. When the connection device 130 is coupled between the connection port 111 of the host device 110 and the connection port 151 of the processing device 150, the control unit 153 controls a switching signal $S_{SW1}$ according to the kind of the connection device 130.

The switching unit 155 determines whether to transmit the external power $P_{EX}$ to the control unit 153 according to the switching signal $S_{SW1}$. When the switching unit 155 transmits the external power $P_{EX}$ to the control unit 153, the control unit 153 operates according to the external power $P_{EX}$. When the switching unit 155 does not transmit the external power $P_{EX}$ to the control unit 153, the control unit 153 operates according to the host power $P_{HT}$ provided by the host device 110.

Assume that the connection device 130 is not an AOC and is a common cable, e.g. a USB 2.0 cable or a USB 3.0 cable. The connection device 130 is capable of transmitting the host power $P_{HT}$ to the processing device 150. Thus, the control unit 153 controls the switching signal $S_{SW1}$ such that the switching unit 155 stops transmitting the external power $P_{EX}$ to the control unit 153. At this time, the control unit 153 operates according to the host power $P_{HT}$ transmitted by the connection device 130.

On the contrary, when the control unit 153 determines that the connection device 130 is an AOC, the control unit 153 controls the switching signal $S_{SW1}$ such that the switching unit 155 transmits the external power $P_{EX}$ to the control unit 153. At this time, the control unit 153 operates according to the external power $P_{EX}$.

In another embodiment, when the connection device 130 is an AOC, the control unit 153 determines the kind of the AOC and controls the switching signal $S_{SW1}$ according to the determination result. For example, if the AOC can transmit power (i.e. the host power $P_{HT}$), the switching unit 155 stops transmitting the external power $P_{EX}$ to the control unit 153. Thus, the control unit 153 operates according to the host power $P_{HT}$ transmitted by the connection device 130.

Contrarily, when the AOC cannot transmit power, the switching unit 155 transmits the external power $P_{EX}$ to the control unit 153. At this time, the control unit 153 operates according to the external power $P_{EX}$.

In other embodiments, when the connection device 130 does not couple between the connection ports 111 and 151, the control unit 153 controls the switching signal $S_{SW1}$ such that the switching unit 155 transmits the external power $P_{EX}$ to the control unit 153. Accordingly, the control unit 153 operates according to the external power $P_{EX}$.

As shown in FIG. 1, the switching unit 155 comprises a control terminal, an input terminal and an output terminal The control terminal receives the switching signal $S_{SW1}$. The input terminal receives the external power $P_{EX}$. The output terminal is coupled to the control unit 153. In this embodiment, the switching unit 155 transmits the external power $P_{EX}$ to the control unit 153 according to the switching signal $S_{SW1}$.

In other embodiments, the switching unit 155 may comprise two input terminals. One input terminal receives the external power $P_{EX}$ and another input terminal receives the host power $P_{HT}$. In this case, the switching unit 155 transmits the external power $P_{EX}$ or the host power $P_{HT}$ to the control unit 153 according to the switching signal $S_{SW1}$.

In this embodiment, the external power $P_{EX}$ is provided by the external device 170. The invention does not limit the kind of the external device 170. In one embodiment, the external device 170 is an adapter.

Figure 2:
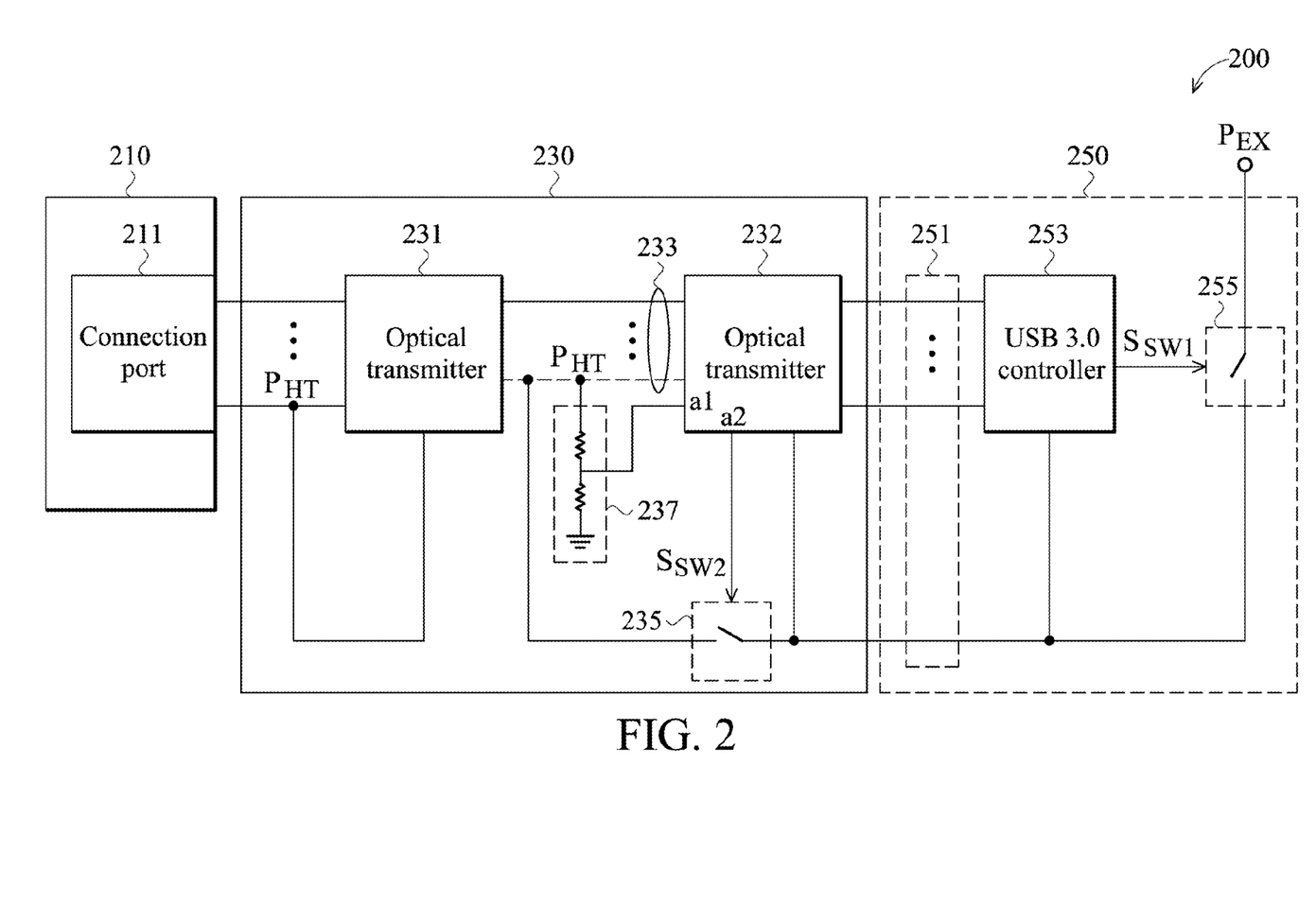
FIG. 2 is a schematic diagram of another exemplary embodiment of an operation system of the invention.

FIG. 2 is a schematic diagram of another exemplary embodiment of an operation system of the invention. The operation system 200 comprises a host device 210 and a processing device 250. The host device 210 communicates with the processing device 250 via a connection device 230. The invention does not limit the kind of the processing device 250. In this embodiment, the processing device 250 is a USB 3.0 device.

As shown in FIG. 2, the processing device 250 comprises a USB 3.0 controller 253 and a switching unit 255. In this embodiment, the USB 3.0 controller 253 is coupled to the connection device 230 via the connection port 251. The USB 3.0 controller 253 controls the switching signal $S_{SW1}$ according to the kind of the connection device 230. The switching unit 255 transmits the external power $P_{EX}$ to the USB 3.0 controller 253 according to the switching signal $S_{SW1}$.

For example, if the connection device 230 transmits the host power $P_{HT}$ to the connection port 251, the USB 3.0 controller 253 controls the switching signal $S_{SW1}$ such that the switching unit 255 stops transmitting the external power $P_{EX}$ to the USB 3.0 controller 253. At this time, the USB 3.0 controller 253 operates according to the host power $P_{HT}$ provided by the connection device 230.

Contrarily, if the connection device 230 does not transmit the host power $P_{HT}$ to the connection port 251, the USB 3.0 controller 253 controls the switching signal $S_{SW1}$ such that the switching unit 255 transmits the external power $P_{EX}$ to the USB 3.0 controller 253. At this time, the USB 3.0 controller 253 operates according to the external power $P_{EX}$ provided by an external device.

Furthermore, the invention does not limit the kind of the connection device 230. In this embodiment, the connection device 230 is an AOC, but the disclosure is not limited thereto. As shown in FIG. 2, the connection device 230 comprises optical transmitters 231, 232, an optical fiber 233, a switching unit 235 and a voltage divider 237.

Each of the optical transmitters 231 and 232 comprises a USB 3.0 interface to couple with the connection port 211 or 251. In this embodiment, the connection ports 211 and 251 are USB 3.0 ports. Additionally, the optical transmitters 231 and 232 are USB 3.0 devices to transform USB 3.0 signals between an electrical format and an optical format.

The optical fiber 233 is coupled between the optical transmitters 231 and 232. Thus, the communication speed of the connection device 230 is faster than the Super-Speed of a USB 3.0. Additionally, the effect of electromagnetic interference (EMI) is reduced because the optical fiber 233 is utilized to communicate data. The optical fiber 233 is one type of AOC. Generally, the AOCs comprise two types. One type can transmit power and the other type cannot transmit power. If the optical fiber 233 is an AOC and the AOC can transmit power, the optical fiber 233 not only comprises four data channels (TX+, TX−, RX+ and RX−), but also comprises two power channels (VBUS and GND). The data channels transmit data, and the power channels transmit the host power $P_{HT}$ and a ground signal (not shown). On the contrary, if the optical fiber 233 is another type of AOCs and the other type cannot transmit power, the optical fiber 233 only comprises four data channels (TX+, TX−, RX+ and RX−).

Further, in one embodiment, each of the optical transmitters 231 and 232 comprises a USB 3.0 interface comprising two pins (D and CLK). In the embodiment, the protocol performed on the pins D and CLK comprises a serial management bus protocol having a data signal and a clock signal, e.g., System Management Bus (SMBUS) protocol, or I2C protocol, or the like. The pins D and CLK issue serial management bus protocol signals to the terminals (D+ and D−) of the connection ports 211 and 251. The processing device 250 and the host device 210 determine whether the terminals (D+ and D−) of the connection ports 211 and 251 are to transmit serial management bus protocol signals. The processing device 250 and the host device 210 determine that the connection device 230 is an AOC and the AOC can transmit power according to the determination result.

When the optical transmitter 231 is connected to the connection port 211 of the host device 210 and the host device 210 determines that the terminals (D+ and D−) of the connection port 211 can transmit serial management bus protocol signals, it indicates that the connection device 230 is an AOC with a function for transmitting power. Thus, the host power $P_{HT}$ is transmitted to the optical transmitter 231 from the host device 210.

As shown in FIG. 2, the connection device 230 comprises a switching unit 235. The pin a2 of the optical transmitter 232 issues a switching signal $S_{SW2}$ to turn on or off the switching unit 235. The switching unit 235 transmits the host power $P_{HT}$ to the optical transmitter 232 and the USB 3.0 controller 253 according to the switching signal $S_{SW2}$. First, only the switching unit 255 is turned on and the switching unit 235 is turned off. Thus, the USB 3.0 controller 253 and the optical transmitter 232 operate according to an external power $P_{EX}$ provided by an external device.

If the connection device 230 is an AOC and the AOC can transmit power, the host power $P_{HT}$ is transmitted to the optical transmitter 232 via the optical fiber 233. The voltage divider 237 processes the host power $P_{HT}$ and provides the processed result to the pin a1 of the optical transmitter 232.

If the connection device 230 is an AOC and the AOC cannot transmit power, the host power $P_{HT}$ is not transmitted to the optical transmitter 232 via the optical fiber 233. The voltage divider 237 pulls low the signal on the pin a1 of the optical transmitter 232.

In this embodiment, when the optical transmitter 232 is coupled to the connection port 251 of the processing device 250 and the processing device 250 determines that the signals on the terminals (D+ and D−) of the connection port 251 are serial management bus protocol signals, the processing device 250 determines that the connection device 230 is an AOC, which can transmit power. In one embodiment, the USB 3.0 controller 253, based on a serial management bus protocol, detects the level of the pin a1 of the optical transmitter 232 for determining whether the connection device 230 can transmit power (e.g. the host power $P_{HT}$). The USB 3.0 controller 253, based on the level of the pin a1, controls the switching signal $S_{SW1}$ for turning on or off the switching unit 255. The optical transmitter 232 controls the switching signal $S_{SW2}$ for turning on of off the switching unit 235.

For example, when the host power $P_{HT}$ is transmitted between the optical transmitters 231 and 232, the level of the pin a1 is set to a first level. Thus, the USB 3.0 controller 253, based on the serial management bus protocol, activates the optical transmitter 232 such that the optical transmitter 232 controls the switching signal $S_{sw2}$ to turn on the switching unit 235. Then, the USB 3.0 controller 253 turns off the switching unit 255 such that the switching unit 255 stops transmitting the external power $P_{EX}$ to the USB 3.0 controller 253. When the switching unit 235 is turned on, the host power $P_{HT}$ is transmitted to the optical transmitter 232 and the USB 3.0 controller 253. Thus, the optical transmitters 231, 232 and the USB 3.0 controller 253 operate according to the host power $P_{HT}$.

Contrarily, when the host power $P_{HT}$ is not transmitted between the optical transmitters 231 and 232, the level of the pin a1 is set to a second level. Thus, the USB 3.0 controller 253 still turns on the switching unit 255 such that the switching unit 255 transmits the external power $P_{EX}$ to the USB 3.0 controller 253 and the optical transmitter 232. At this time, the switching unit 235 is still turned off. Accordingly, the optical transmitter 232 and the USB 3.0 controller 253 operate according to the external power $P_{EX}$.

In another embodiment, assuming that the connection device 230 is not an AOC and is a common cable (e.g. a USB 2.0 cable or a USB 3.0 cable). The common cable can transmit the host power $P_{HT}$ to the processing device 250. Thus, the controller 253 generates the switching signal $S_{sw1}$. The switching unit 255 stops transmitting the external power $P_{EX}$ to the controller 253 according to the switching signal $S_{sw1}$. At this time, the controller 253 operates according to the host power $P_{HT}$ transmitted by the connection device 230.

Figure 3A:
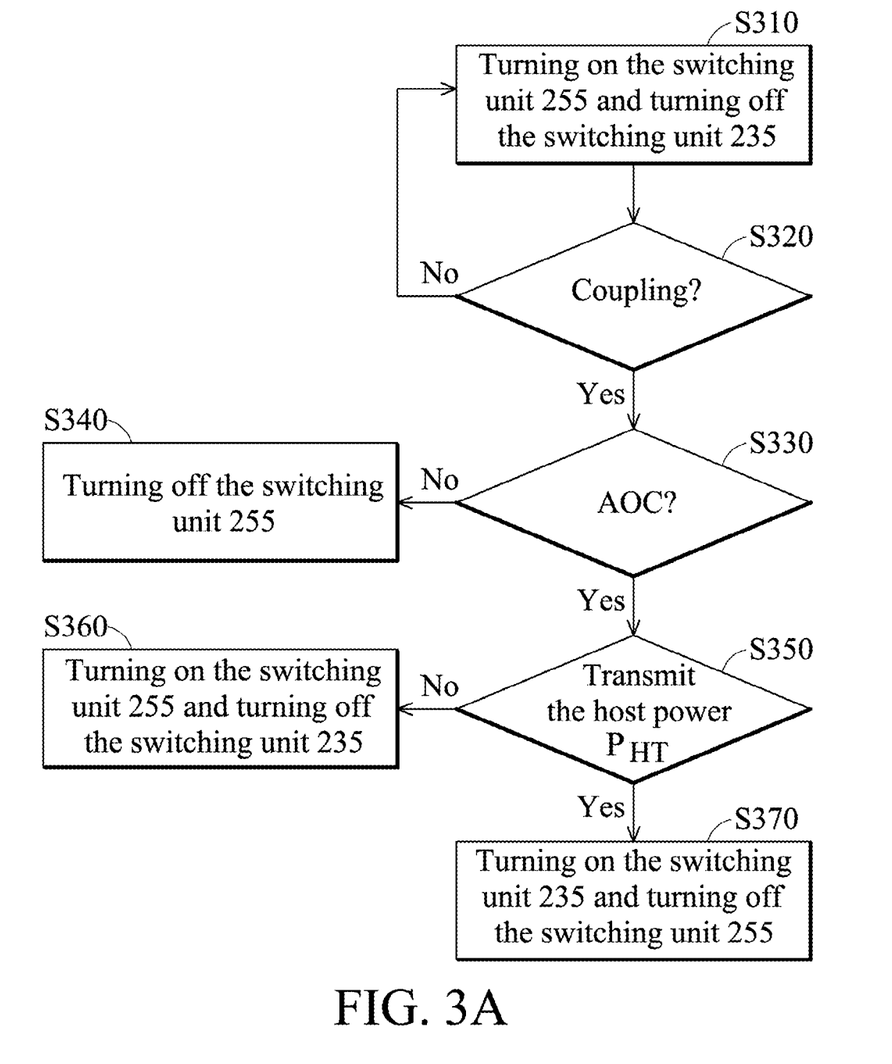
FIG. 3A is a schematic diagram of an exemplary embodiment of a control method of the invention.

FIG. 3A is a schematic diagram of an exemplary embodiment of a control method of the invention. Referring to FIG. 2, the switching unit 255 is turned on and the switching unit 235 is turned off (step S310). In this embodiment, since the switching unit 255 is turned on and the switching unit 235 is turned off, the USB 3.0 controller 253 operates according to the external power $P_{EX}$.

Then, the connection device 230 determines whether it is coupled between the host device 210 and the processing device 250 (step S320). The invention does not limit the method for determining whether the connection device 230 is coupled between the host device 210 and the processing device 250. In one embodiment, the USB 3.0 controller 253 determines whether the connection device 230 is coupled between the host device 210 and the processing device 250 according to the condition of a termination resistor of the connection device 230.

If the connection device 230 is not coupled to the host device 210, step S310 is executed. If the connection device 230 is coupled to the host device 210, it is determined whether the connection device 230 is an AOC (step S330). The invention does not limit the method for determining whether the connection device 230 is an AOC. In one embodiment, if the connection device 230 transmits data according to a serial management bus protocol (e.g. SMBUS or I$^2$C), it indicates that the connection device 230 is an AOC. Contrarily, if the connection device 230, not based on the serial management bus protocol, transmits data, it indicates that the connection device 230 is a common USB 3.0 device.

The serial management bus protocol utilizes two channels to transmit a data signal and a clock signal. In one embodiment, when the connection device 230 is an AOC, the optical transmitters 231 and 232 transmit the data signal and the clock signal according to the serial management bus protocol via two GPIO (general purpose input output) pins such that the host device 210 and the USB 3.0 controller 253 can determine whether the connection device 230 is an AOC. In one embodiment, one GPIO pin among the two GPIO pins transmits the data signal and another GPIO pin transmits the clock signal. In one embodiment, the processing device 250 and the host device 210 determine whether the terminals D+ and D− of the connection ports 211 and 251 are transmitting serial management bus protocol signals. The processing device 250 and the host device 210 recognize the connection device 230 as an AOC according to the determination result.

Assume that the connection device 230 is not an AOC and is a common cable (e.g. a USB 2.0 cable or a USB 3.0 cable). Since the common cable can transmit the host power $P_{HT}$ to the processing device 250, the switching unit 255 is turned off (step S340). In this embodiment, the controller 253 generates the switching signal $S_{sw1}$ to turn off the switching unit 255 such that the switching unit 255 stops transmitting the external power $P_{EX}$ to the controller 253. Thus, the USB 3.0 controller 253 operates according to the host power $P_{HT}$ transmitted by the connection device 230.

If the connection device 230 is an AOC, it is determined whether the connection device 230 can transmit the host power $P_{HT}$ (step S350). The AOC comprises two types. One type can transmit power and another type cannot transmit power. If the optical fiber 233 can transmit power, the optical fiber 233 comprises four data channels (TX+, TX−, RX+, RX−) to transmit data and two power channels (VBUS, GND) to transmit the host power $P_{HT}$ and a ground signal (not shown). Contrarily, if the optical fiber 233 cannot transmit power, the optical fiber 233 only comprises four data channels (TX+, TX−, RX+, RX−) to transmit data.

Furthermore, the invention does not limit the method for determining whether the connection device 230 can transmit the host power $P_{HT}$. In one embodiment, the USB 3.0 controller 253 determines that the connection device 230 can transmit the host power $P_{HT}$ according to the level of the pin a1 of the optical transmitter 232.

In one embodiment, the connection device 230 comprises a voltage divider (e.g. 237). The voltage divider 237 processes voltage in a specific channel (e.g. the power channel VBUS) and provides the processing result to the pin a1 of the optical transmitter 232. The USB 3.0 controller 253 determines whether the connection device 230 can transmit the host power $P_{HT}$ according to the pin a1 of the optical transmitter 232.

In other embodiments, the connection device 230 comprises a register (not shown). The register stores a pre-determined value. The pre-determined value is set by a manufacturer. The USB 3.0 controller 253 determines whether the connection device 230 can transmit the host power $P_{HT}$ according to the pre-determined value of the register. In one embodiment, the register is disposed in an optical transmitter of the connection device 230.

In another embodiment, a level setting unit (not shown) is utilized to set the level of the pin a1. The USB 3.0 controller 253 determines whether the connection device 230 can transmit the host power $P_{HT}$ according to the level of the pin a1. For example, if the level setting unit comprises a pull-high resistor, it indicates that the connection device 230 can transmit the host power $P_{HT}$. On the contrary, if the level setting unit comprises a pull-low resistor, it indicates that the connection device 230 cannot transmit the host power $P_{HT}$.

If the connection device 230 cannot transmit the host power $P_{HT}$, the switching unit 255 is still turned on and the switching unit 235 is turned off (step S360). Accordingly, the USB 3.0 controller 253 and the optical transmitter 232 operate according to the external power $P_{EX}$. Contrarily, if the connection device 230 can transmit the host power $P_{HT}$, the switching unit 235 is turned on and the switching unit 255 is turned off (step S370). Thus, the USB 3.0 controller 253, the optical transmitters 231 and 232 operate according to the host power $P_{HT}$.

Figure 3B:
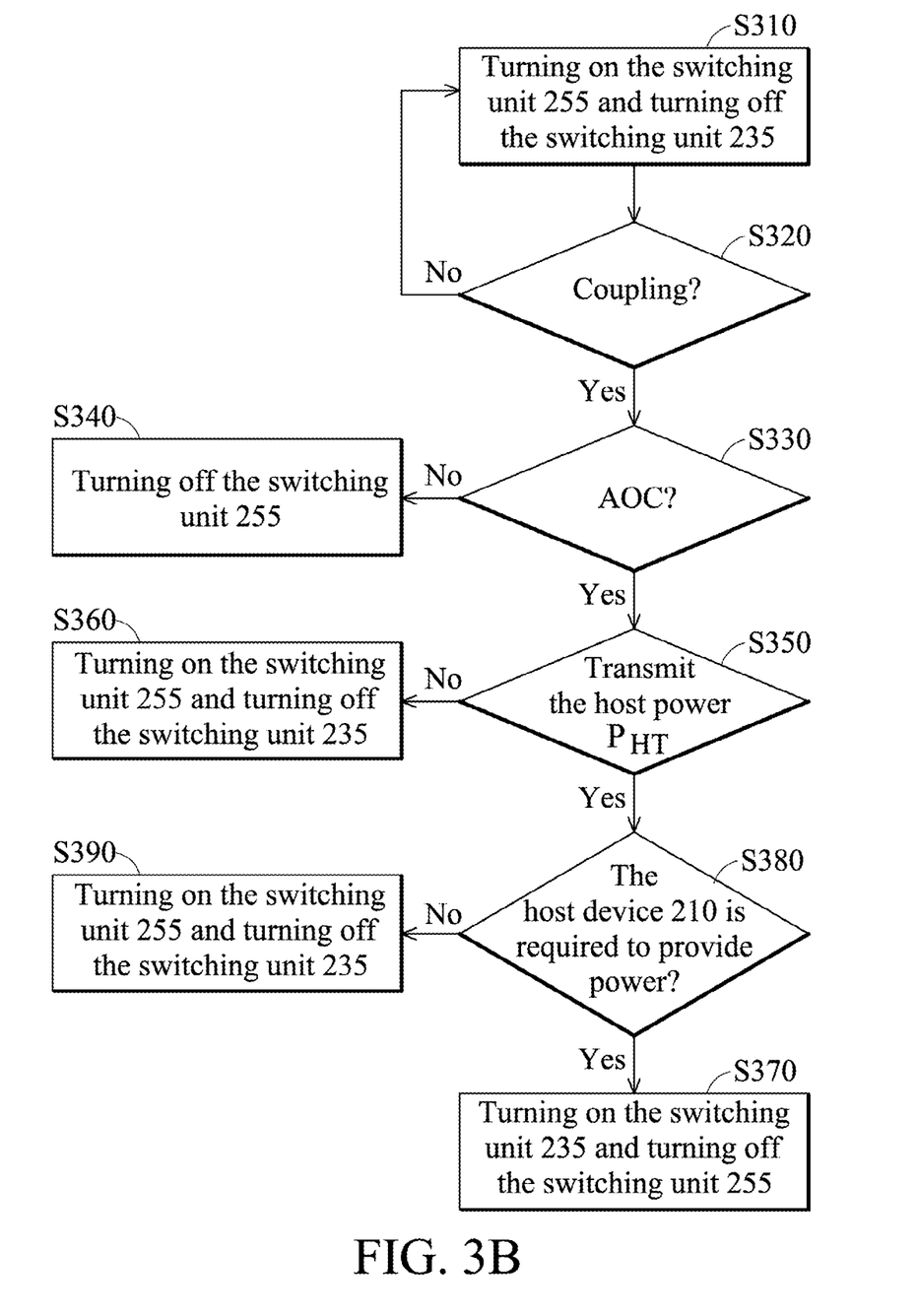
FIG. 3B is a schematic diagram of another exemplary embodiment of a control method of the invention.

FIG. 3B is a schematic diagram of another exemplary embodiment of a control method. FIG. 3B is similar to FIG. 3A except for the addition of steps 5380 and 5390. In step S380, it is determined whether the host device 210 is required to provide power. In one embodiment, the connection device 230 comprises a register (not shown). The USB 3.0 controller 253 determines whether to receive power provided by the host device 210 according to the data stored in the register.

If it is determined that the host device 210 is required to provide power, the USB 3.0 controller 253 first turns on the switching unit 235 and then turns off the switching unit 255 (step S370). Contrarily, if it is determined that the host device 210 is not required to provide power, the switching unit 255 is turned on and the switching unit 235 is turned off (step S390).

Figure 4A:
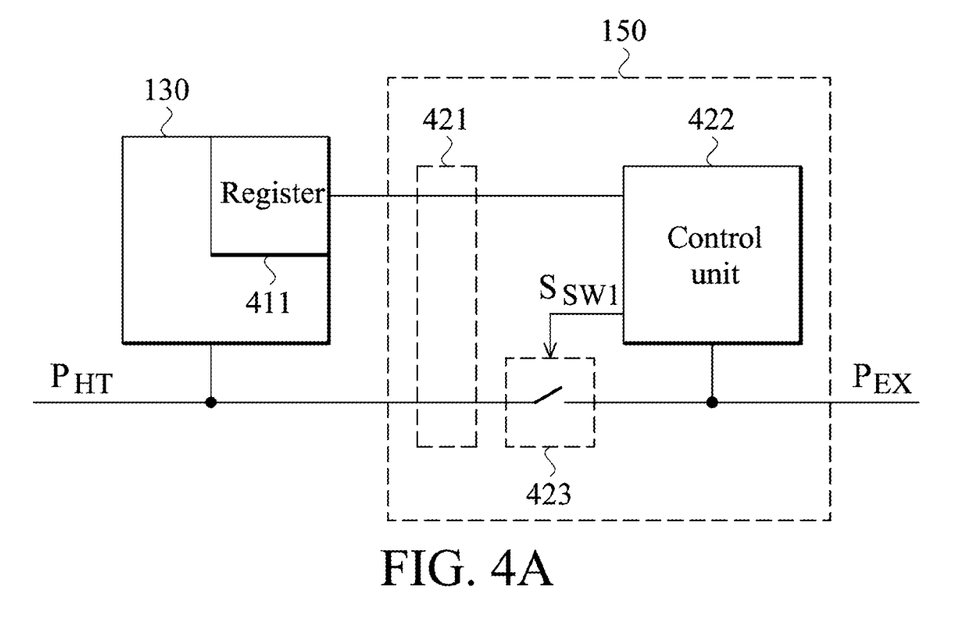
FIG. 4A is a schematic diagram of another exemplary embodiment of an operation system of the invention.

FIG. 4A is a schematic diagram of another exemplary embodiment of an operation system. For brevity, FIG. 4A only shows a portion of an operation system. In this embodiment, the connection device 130 is an AOC and comprises a register 411. The register 411 stores a pre-determined value for indicating whether the AOC can transmit power (e.g. the host power $P_{HT}$). The pre-determined value is set by a manufacturer. The control unit 422 obtains the pre-determined value via the connection port 421 and controls the switching signal $S_{SW1}$ according to the obtained result. The switching unit 423 transmits the external power $P_{EX}$ to the connection device 130 according to the switching signal $S_{SW1}$.

Figure 4B:
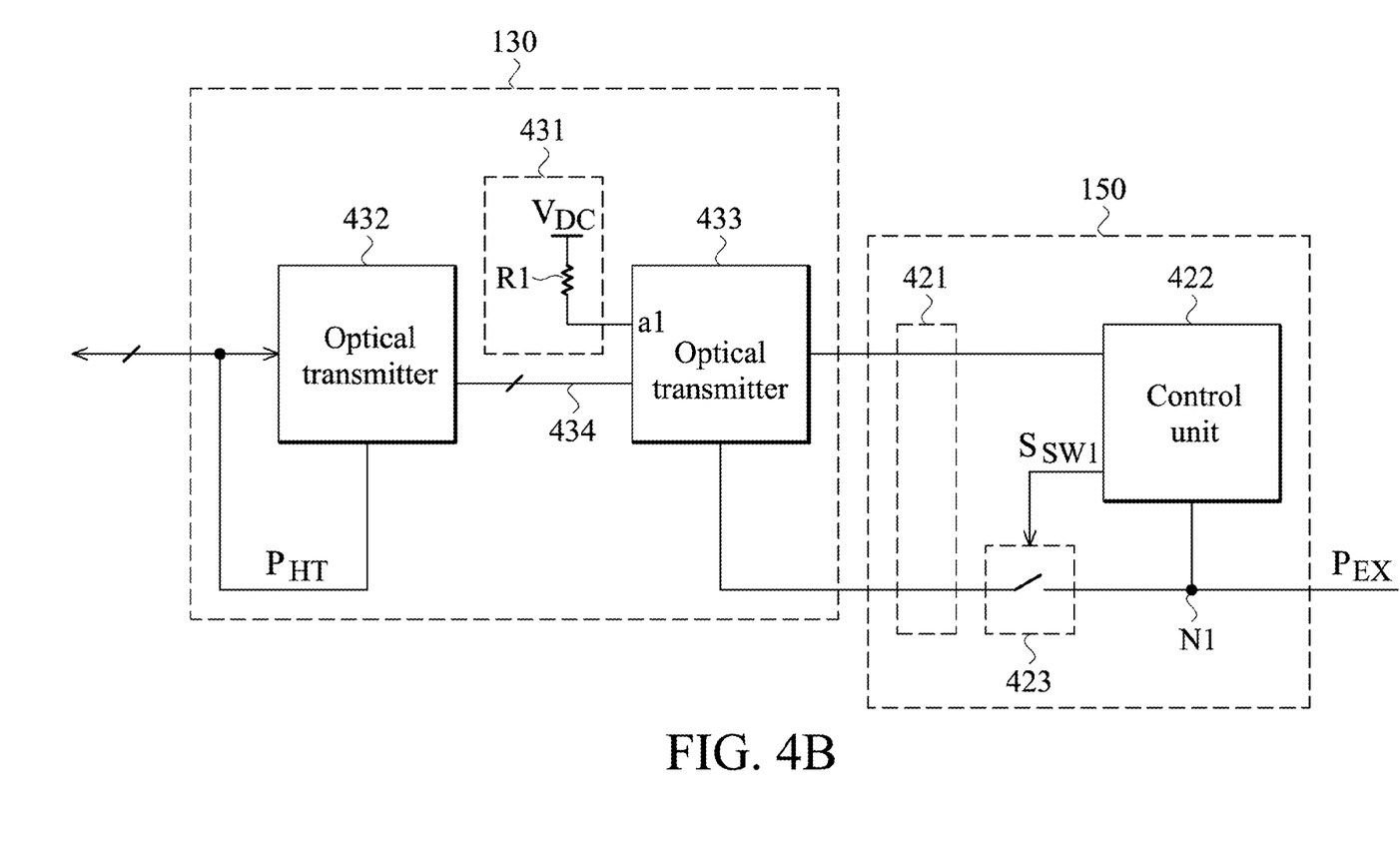
FIG. 4B is a schematic diagram of another exemplary embodiment of an operation system of the invention.

FIG. 4B is a schematic diagram of another exemplary embodiment of an operation system. For brevity, FIG. 4B only shows a portion of an operation system. In this embodiment, the connection device 130 is an AOC and comprises a level setting unit 431. In this embodiment, the level setting unit 431 comprises a pull-high resistor R1. The pull high resistor R1 sets the level of the pin a1 of the optical transmitter 433 such that the level of the pin a1 is at a high level.

In this embodiment, when the level of the pin a1 is at the high level, it indicates that the connection device 130 can transmit the host power $P_{HT}$. In other words, the optical fiber 434 further comprises two power channels (VBUS, GND). The power channels transmit the host power $P_{HT}$ and a ground signal (not shown) to the optical transmitter 433. Therefore, the control unit 422 turns off the switching unit 423. At this time, the optical transmitters 432 and 433 operate according to the host power $P_{HT}$, and the control unit 422 operates according to the external power $P_{EX}$. In another embodiment, the switching unit 235 shown in FIG. 2 can be applied in FIG. 4B.

In other embodiments, the switching unit 423 can be disposed on the right side of the node N1. In this case, when the pin a1 of the optical transmitter 433 is at the high level, the control unit 422 turns off the switching unit 423. At this time, the optical transmitters 432, 433 and the control unit 422 operate according to the host power $P_{HT}$.

Figure 4C:
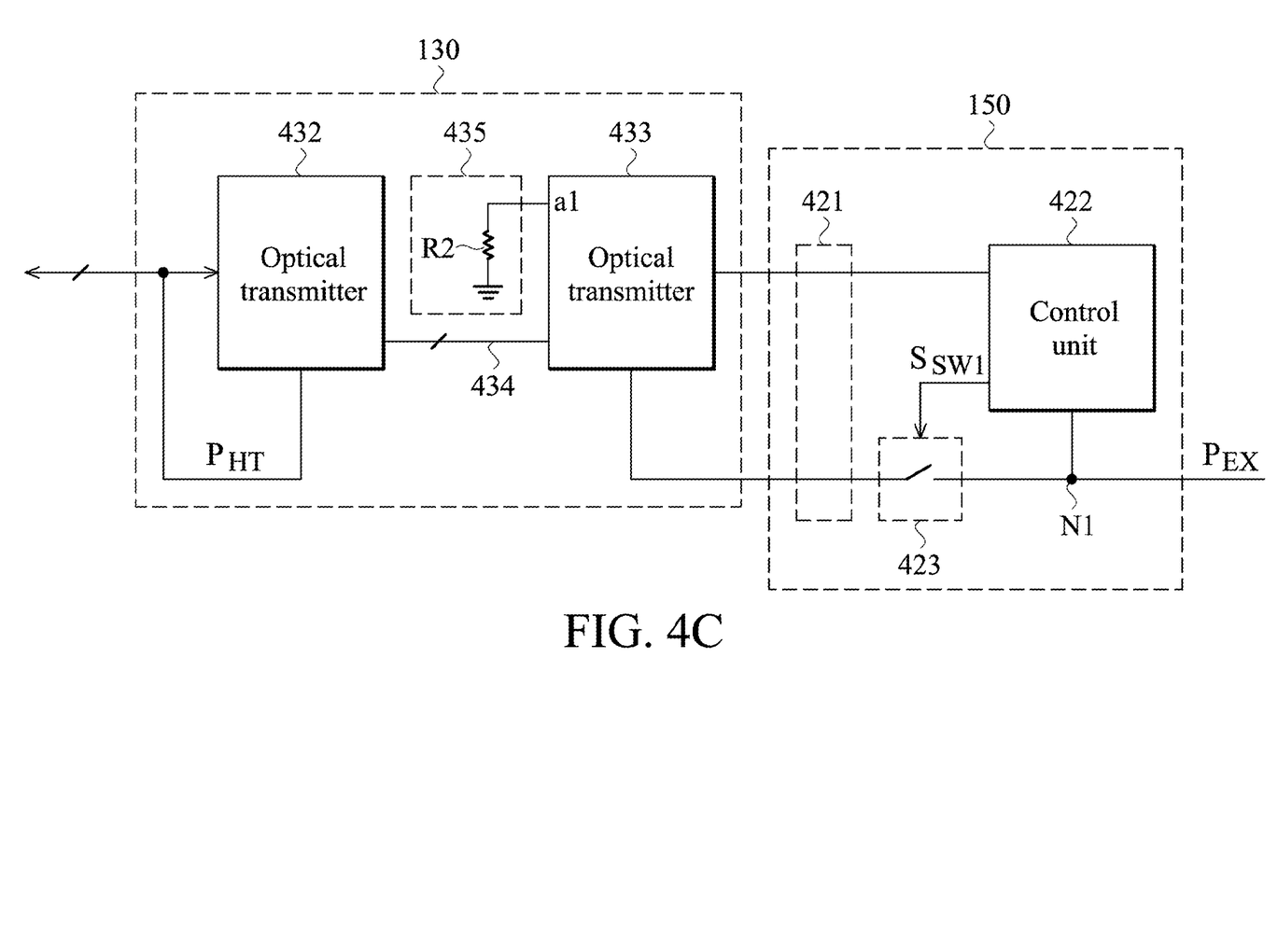
FIG. 4C is a schematic diagram of another exemplary embodiment of an operation system of the invention.

FIG. 4C is a schematic diagram of another exemplary embodiment of an operation system. FIG. 4C only shows a portion of an operation system. In this embodiment, the level setting unit 435 comprises a pull-low resistor R2. The pull-low resistor R2 sets the level of the pin a1 of the optical transmitter 433 such that the level of the pin a1 is at a low level.

In this embodiment, when the level of the pin a1 is at the low level, it indicates that the connection device 130 cannot transmit the host power $P_{HT}$. In other words, the optical fiber 434 does not comprise two power channels (VBUS, GND). Thus, the optical fiber 434 does not transmit the host power $P_{HT}$ and a ground signal to the optical transmitter 433. The control unit 422 turns on the switching unit 423. At this time, the control unit 422 and the optical transmitter 433 operate according to the external power $P_{EX}$. Similarly, in another embodiment, the switching unit 235 shown in FIG. 2 can be applied to FIG. 4C.

Since the processing device (e.g. 150 or 250), based on the type of a connection device (e.g. 130 or 230), determines the power source (a host device or an external device), the processing device does not simultaneously receive two powers for a long period of time. Further, since the processing device can control the power source of the connection device, it is ensured that the connection device normally operates.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A processing device coupled to a host device via a connection device, comprising:
a connection port for connecting to the connection device;
a control unit controlling a switching signal according to the kind of the connection device when the connection is coupled between the connection port and the host device; and
a switching unit transmitting an external power to the control unit according to the switching signal, wherein when the switching unit transmits the external power to the control unit, the control unit operates according to the external power provided by an external device, and when the switching unit does not transmit the external power to the control unit, the control unit operates according to a host power provided by the host device,
wherein when the connection device transmits the host power to the connection port and the switching unit receives the external power from the external device, the control unit controls the switching signal such that the switching unit stops transmitting the external power to the control unit.

2. The processing device as claimed in claim 1, wherein when the connection device is not coupled between the connection port and the host device, the control unit controls the switching signal such that the switching unit transmits the external power to the control unit.

3. The processing device as claimed in claim 1, wherein if the control unit determines that the connection device is not an active optical cable (AOC), the control unit controls the switching signal such that the switching unit does not transmit the external power to the control unit, and wherein the control unit operates according to the host power.

4. The processing device as claimed in claim 3, wherein if the control unit determines that the connection device is the AOC, the control unit determines whether the AOC transmits the host power to the connection port and controls the switching signal according to the determination result.

5. The processing device as claimed in claim 4, wherein if the AOC transmits the host power to the connection port, the control unit controls the switching signal such that the switching unit does not transmit the external power to the control unit, and wherein the control unit operates according to the host power.

6. The processing device as claimed in claim 4, wherein if the AOC does not transmit the host power to the connection port, the control unit controls the switching signal such that the switching unit transmits the external power to the control unit.

7. An operation system comprising:
a host device comprising a first connection port and providing a host power; and
a processing device coupled to the host device via a connection device and comprising:
a control unit controlling a first switching signal according to the kind of the connection device when the connection is coupled between the first connection port and a second connection port of the processing unit; and
a first switching unit transmitting an external power to the control unit according to the first switching signal, wherein when the first switching unit transmits the external power to the control unit, the control unit operates according to the external power, and when the first switching unit does not transmit the external power to the control unit, the control unit operates according to the host power,
wherein when the connection device transmits the host power to the second connection port and the first switching unit receives the external power from the external device, the control unit controls the switching signal such that the switching unit stops transmitting the external power to the control unit.

8. The operation system as claimed in claim 7, wherein when the connection device is not coupled between the first and the second connection ports, the control unit controls the first switching signal such that the first switching unit transmits the external power to the control unit.

9. The operation system as claimed in claim 7, wherein if the control unit determines that the connection device is not an active optical cable (AOC), the control unit controls the first switching signal such that the first switching unit does not transmit the external power to the control unit, and wherein the control unit operates according to the host power.

10. The operation system as claimed in claim 9, wherein if the control unit determines that the connection device is the AOC, the control unit determines whether the AOC transmits the host power to the second connection port and controls the first switching signal according to the determination result.

11. The operation system as claimed in claim 10, wherein if the AOC transmits the host power to the second connection port, the control unit controls the first switching signal such that the first switching unit does not transmit the external power to the control unit, and wherein the control unit operates according to the host power.

12. The operation system as claimed in claim 10, wherein if the AOC does not transmit the host power to the second connection port, the control unit controls the switching signal such that the switching unit transmits the external power to the control unit.

13. The operation system as claimed in claim 10, wherein the connection device comprises:
a first optical transmitter for coupling to the first connection port;
a second optical transmitter for coupling to the second connection port; and
an optical fiber coupled between the first and the second optical transmitters.

14. The operation system as claimed in claim 13, wherein if the connection device is the AOC, the optical fiber transmits the host power and comprises a plurality of data channels to transmit data and a plurality of power channels to transmit the host power and a ground signal.

15. The operation system as claimed in claim 14, wherein the connection device further comprises:
a voltage divider processing the host power transmitted by the optical fiber and providing a processing result to a pin of the second optical transmitter, wherein the control unit controls the first switching signal according to the level of the pin such that the first switching unit stops transmitting the external power to the control unit, and the control unit operates according to the host power.

16. The operation system as claimed in claim 14, wherein the connection device further comprises:
a register storing a first pre-determined value, wherein the control unit controls the first switching signal according to the first pre-determined value such that the first switching unit stops transmitting the external power to the control unit, and the control unit operates according to the host power.

17. The operation system as claimed in claim 14, wherein the connection device further comprises:
a second switching unit transmitting the host power or the external power to the second optical transmitter according to a second switching signal, wherein when the connection device transmits the host power to the second optical transmitter, the control unit activates the second optical transmitter to control the second switching signal such that the second switching unit transmits the host power to the second optical transmitter.

18. The operation system as claimed in claim 13, wherein if the connection device is the AOC, and wherein the optical fiber does not transmit the host power and only comprises a plurality of data channels to transmit data.

19. The operation system as claimed in claim 18, wherein the connection device further comprises:
a voltage divider connecting the pin of the second optical transmitter to ground, wherein the control unit controls the first switching signal according to the level of the pin such that the first switching unit transmits the external power to the control unit.

20. The operation system as claimed in claim 18, wherein the connection device further comprises:
a register storing a second pre-determined value, wherein the control unit controls the first switching signal according to the second pre-determined value such that the first switching unit transmits the external power to the control unit.

21. The operation system as claimed in claim 18, wherein the connection device further comprises:
a second switching unit transmitting the host power or the external power to the second optical transmitter according to a second switching signal, wherein when the connection device does not transmit the host power to the second connection port, the control unit activates the second optical transmitter to control the second switching signal such that the second switching unit transmits the external power to the second optical transmitter.

* * * * *